(12) United States Patent
Kayama

(10) Patent No.: US 12,198,511 B2
(45) Date of Patent: Jan. 14, 2025

(54) MONEY PROCESSING SYSTEM AND MONEY PROCESSING METHOD

(71) Applicant: Glory Ltd., Hyogo (JP)

(72) Inventor: Shinichi Kayama, Hyogo (JP)

(73) Assignee: Glory Ltd., Himeji (JP)

( * ) Notice: Subject to any disclaimer, the term of this patent is extended or adjusted under 35 U.S.C. 154(b) by 0 days.

(21) Appl. No.: 18/182,405

(22) Filed: Mar. 13, 2023

(65) Prior Publication Data

US 2023/0298441 A1 Sep. 21, 2023

(30) Foreign Application Priority Data

Mar. 15, 2022 (JP) ................. 2022-039948

(51) Int. Cl.
| | | |
|---|---|---|
| *G07F 19/00* | (2006.01) | |
| *G06Q 20/10* | (2012.01) | |
| *G06Q 20/40* | (2012.01) | |

(52) U.S. Cl.
CPC ....... *G07F 19/203* (2013.01); *G06Q 20/1085* (2013.01); *G06Q 20/401* (2013.01)

(58) Field of Classification Search
CPC .......... G07F 19/203; G06Q 20/1085; G06Q 20/401; G06Q 20/405; G07D 11/14; G07D 11/60
See application file for complete search history.

(56) References Cited

U.S. PATENT DOCUMENTS

| | | |
|---|---|---|
| 2010/0245043 A1 | 9/2010 | Doi et al. |
| 2018/0247479 A1* | 8/2018 | Yamashita ............. G07D 11/20 |
| 2020/0167622 A1* | 5/2020 | Sinha ................... G06Q 20/227 |
| 2021/0081937 A1 | 3/2021 | Yaqub |

FOREIGN PATENT DOCUMENTS

| | | | | |
|---|---|---|---|---|
| JP | 2008146145 A | * | 6/2008 | ......... G06Q 20/1085 |
| JP | 2010026761 A | * | 2/2010 | |
| JP | 5135782 B2 | | 2/2013 | |

OTHER PUBLICATIONS

Extended European Search Report issued Jul. 14, 2023 in European Patent Application No. No. 23161427.2, 8 pages.

* cited by examiner

*Primary Examiner* — Sonji N Johnson
(74) *Attorney, Agent, or Firm* — XSENSUS LLP

(57) ABSTRACT

A possibility of occurrence of forgetting to take money is reduced. A money processing system includes: a first authentication section authenticating a user with a first authentication method when starting a withdrawal transaction; and a second authentication section authenticating a user with a second authentication method, which is different from the first authentication method, when opening an opening-closing part of each of plural withdrawal ports, to which money related to the withdrawal transaction has been conveyed.

17 Claims, 10 Drawing Sheets

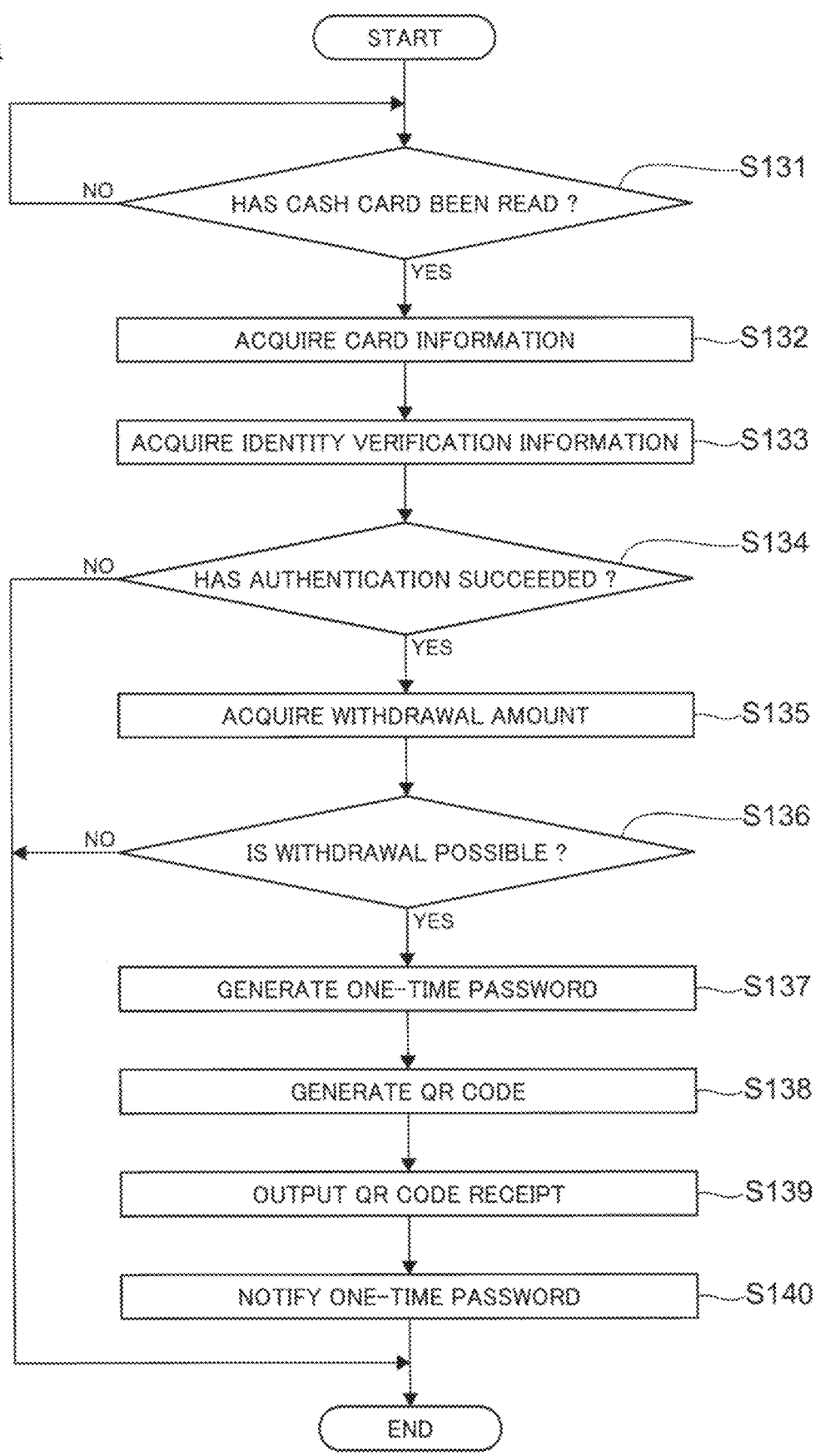

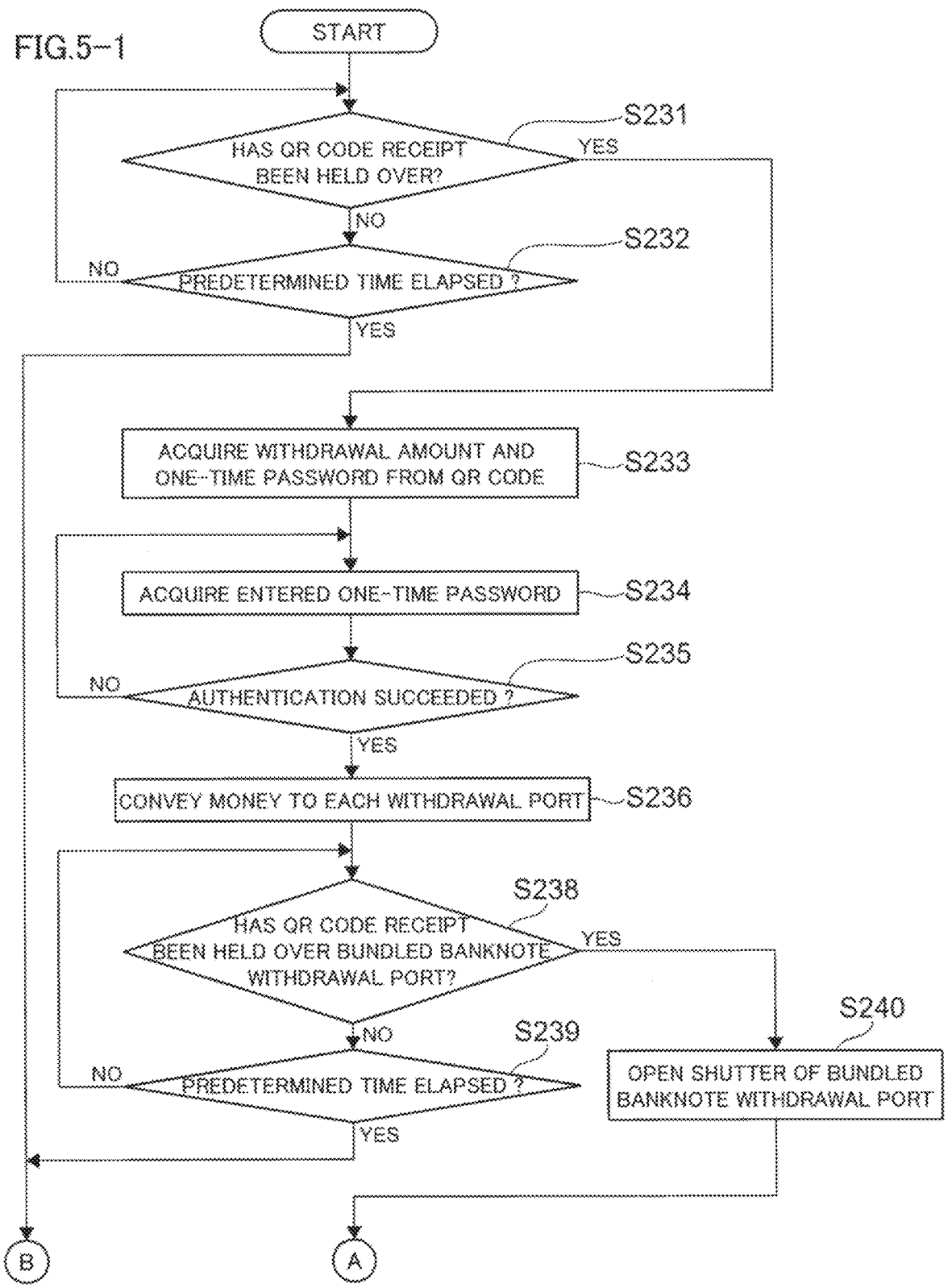

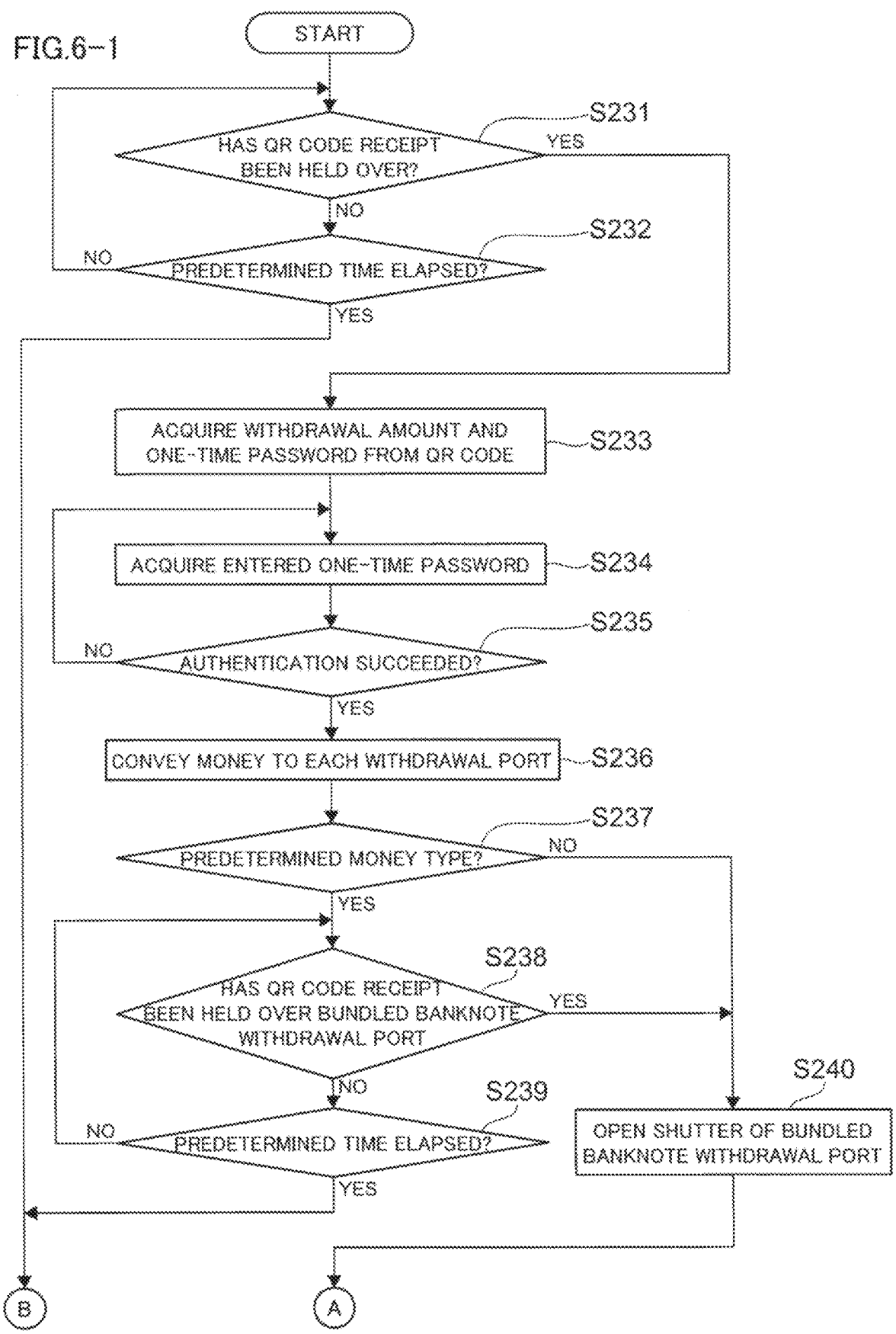

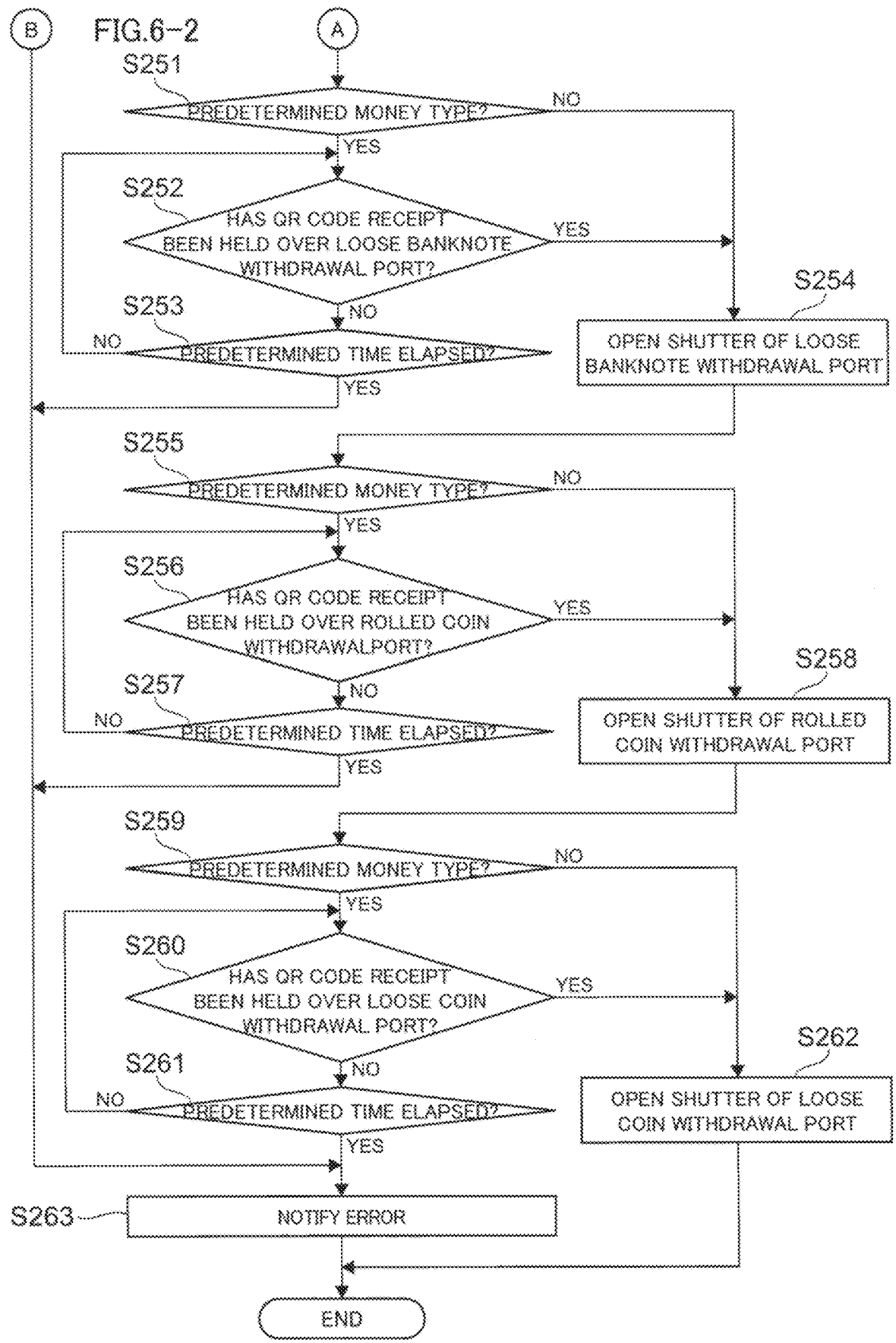

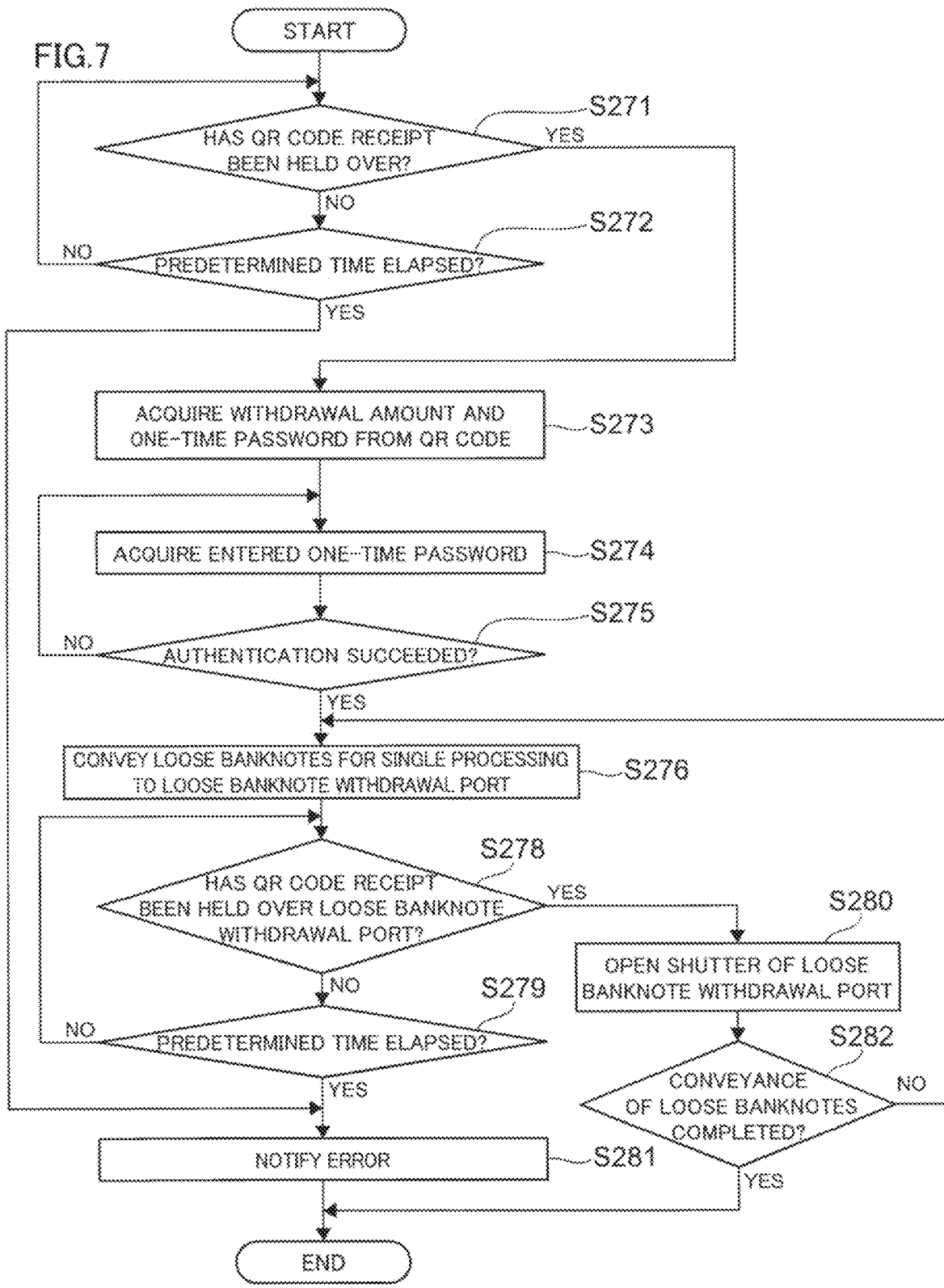

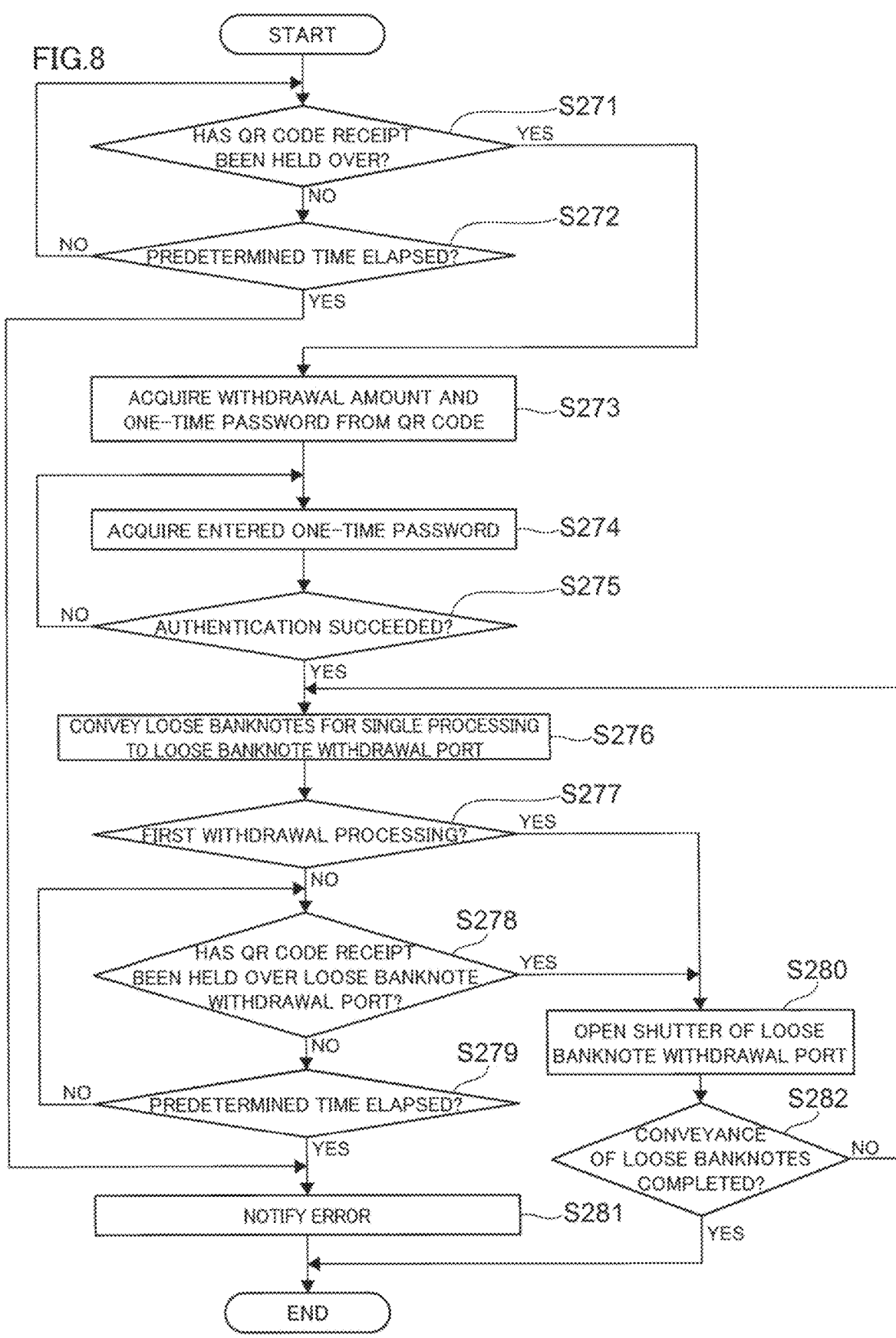

MONEY PROCESSING SYSTEM AND MONEY PROCESSING METHOD

CROSS-REFERENCE TO RELATED APPLICATIONS

This application is based on and claims priority under 35 USC § 119 to Japanese Patent Application No. 2022-039948 filed Mar. 15, 2022, the disclosure is incorporated herein by reference in its entirety.

BACKGROUND

Technical Field

The present disclosure relates to a money processing system and a money processing method.

Background Art

Patent Document 1 describes an automatic transaction device in which a PIN code and withdrawal transaction information entered by a display operation part are transmitted to a host computer, the host computer performs customer verification based on the PIN code, withdrawal instruction notification and registered finger vein information that have been transmitted from the host computer are received upon determination whether or not the withdrawal transaction is possible based on the withdrawal transaction information, finger vein information of the customer is acquired by the biological information acquisition part, the finger vein information is compared with the registered finger vein information, and when both pieces of finger vein information are identical, cash is withdrawn.

CITATION LIST

Patent Literature

Patent Document 1: Japanese Patent No. 5135782

SUMMARY

Technical Problem

Adoption of a configuration that authenticates only once when opening shutters of a banknote deposit and withdrawal port or a coin deposit and withdrawal port may cause a possibility of forgetting to take money.

An object of the present disclosure is to reduce the possibility of forgetting to take money.

Solution to Problem

Under the above object, the present disclosure provides a money processing system including: a first authentication section authenticating a user with a first authentication method when starting a withdrawal transaction; and a second authentication section authenticating a user with a second authentication method, which is different from the first authentication method, when opening an opening-closing part of each of plural withdrawal ports, to which money related to the withdrawal transaction has been conveyed.

The plural withdrawal ports may be provided for respective plural money types, and the second authentication section may authenticate a user with the second authentication method when opening the opening-closing part of each the plural withdrawal ports.

The plural withdrawal ports may be provided for respective plural money types, and the second authentication section may authenticate a user with the second authentication method when opening an opening-closing part of a withdrawal port of a predetermined money type, and may not authenticate a user with the second authentication method when opening the opening-closing part of the withdrawal port of any of the plural money types other than the predetermined money type.

There may be provided plural units each including one of the plural withdrawal ports, and the second authentication section may authenticate a user with the second authentication method when opening an opening-closing part of the one of the plural withdrawal ports included in each of the plural units.

When withdrawal processing is performed plural times in one of the plural withdrawal ports in the withdrawal transaction, the second authentication section may authenticate a user with the second authentication method when opening the opening-closing of the one of the plural withdrawal ports every time the withdrawal processing is performed.

When withdrawal processing is performed plural times in one of the plural withdrawal ports in the withdrawal transaction, the second authentication section may not authenticate a user with the second authentication method when opening the opening-closing part of the one of the plural withdrawal ports in a first withdrawal processing, and may authenticate a user with the second authentication method when opening the opening-closing part of the one of the plural withdrawal ports in a second or subsequent withdrawal processing.

The second authentication section may not authenticate a user having a predetermined attribute with the second authentication method when opening the opening-closing part of each of the plural withdrawal ports.

The money processing system may further include: a counter terminal installed at a counter; and a money processing device processing money, where the first authentication section may be provided in the counter terminal, and the second authentication section may be provided in the money processing device. In this case, the counter terminal may include: an acquisition section acquiring authentication information used for authenticating a user with the second authentication method by the second authentication section; and an output section outputting the authentication information on a medium. Alternatively, the counter terminal may include: an acquisition section acquiring reference authentication information serving as a reference for authenticating a user with the second authentication method by the second authentication section; and a transmission section transmitting the reference authentication information to one of the money processing device and an external device that can transmit information to the money processing device.

The money processing system may further include: a third authentication section authenticating a user with a third authentication method when starting processing to convey money related to the withdrawal transaction to one of the plural withdrawal ports. The second authentication method and the third authentication method may be different from the first authentication method.

The first authentication section may include a reader reading information from a first source, the information authenticating a user, and the second authentication section may include a reader reading information from a second source, the information authenticating a user, the second source being different from the first source. In this case, the reader of the first authentication section may be a card reader reading information from a card as the first source, and the reader of the second authentication section may be a QR reader reading information from a QR code as the second source. In this case, the money processing system may further include a printer configured to output a QR code in a case where information read from a card in the first authentication section has been authenticated successfully. In this case, the reader of the first authentication section and the printer may be installed in a first device, the reader of the second authentication section may be installed in a second device, and the second device may be located away from the first device.

The third authentication section may include a reader reading information from a source, the information having a one-time password.

Moreover, the present disclosure provides a money processing method including: authenticating a user with a first authentication method when starting a withdrawal transaction; and authenticating a user with a second authentication method, which is different from the first authentication method, when opening an opening-closing part of each of plural withdrawal ports, to which money related to the withdrawal transaction has been conveyed.

Advantageous Effects

According to the present disclosure, it is possible to reduce the possibility of forgetting to take money.

BRIEF DESCRIPTION OF DRAWINGS

An exemplary embodiment of the present disclosure will be described in detail based on the following figures, wherein:

FIG. 4 is a flowchart showing an operation example of the counter terminal in the exemplary embodiment of the present disclosure;

FIG. 5-1 is a flowchart showing a first operation example of the money processing device in the exemplary embodiment of the present disclosure;

FIG. 5-2 is a flowchart also showing the first operation example of the money processing device in the exemplary embodiment of the present disclosure;

FIG. 6-1 is a flowchart showing a second operation example of the money processing device in the exemplary embodiment of the present disclosure;

FIG. 6-2 is a flowchart also showing the second operation example of the money processing device in the exemplary embodiment of the present disclosure;

FIG. 7 is a flowchart showing a third operation example of the money processing device in the exemplary embodiment of the present disclosure; and FIG. 8 is a flowchart showing a fourth operation example of the money processing device in the exemplary embodiment of the present disclosure.

DESCRIPTION OF EMBODIMENT

Hereinafter, an exemplary embodiment according to the present disclosure will be described in detail with reference to attached drawings.

Overall Configuration of Money Processing System

Figure 1:
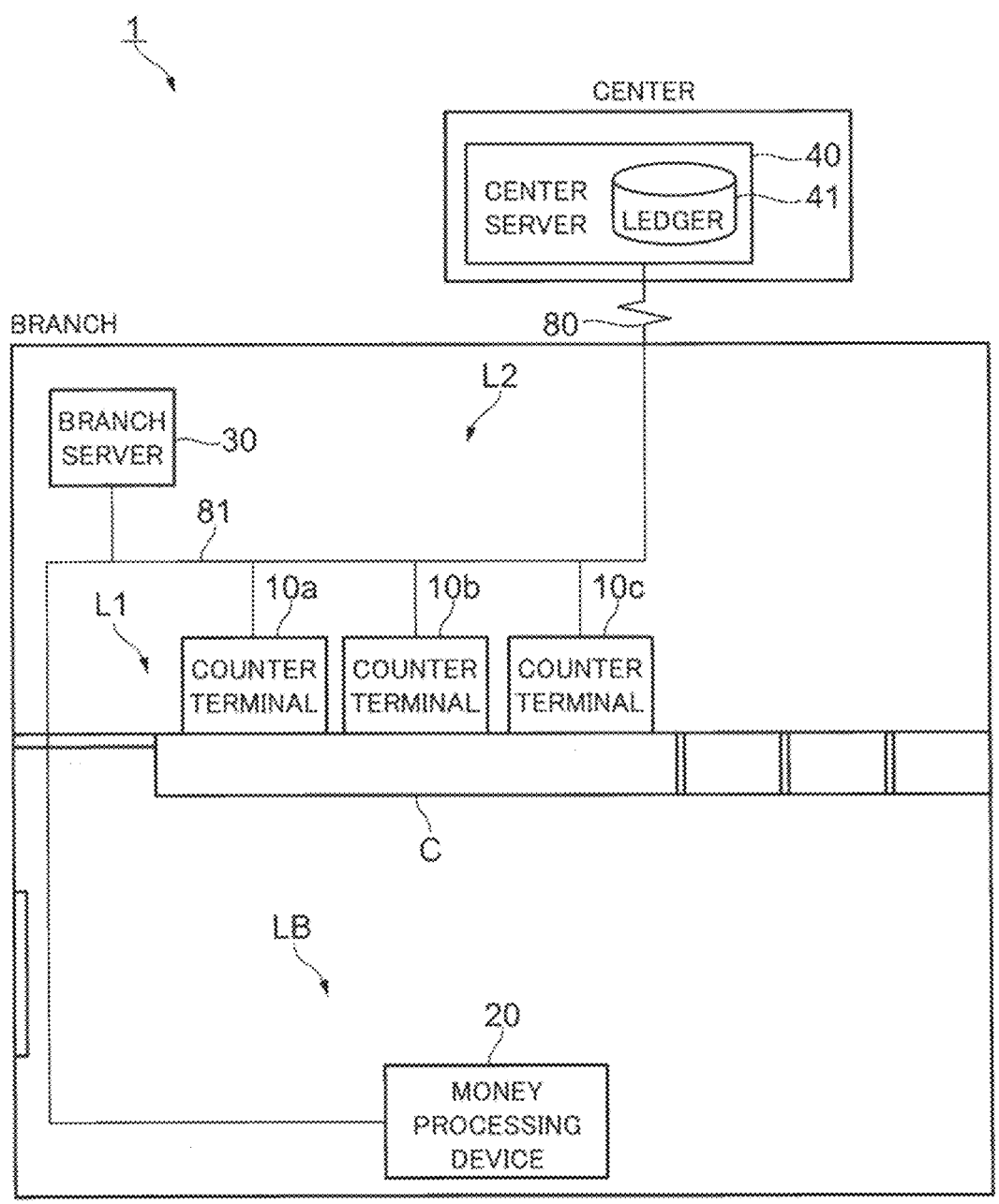
FIG. 1 shows an overall configuration of a money processing system in an exemplary embodiment of the present disclosure.

FIG. 1 shows an overall configuration of a money processing system 1 in the exemplary embodiment. The money processing system 1 may be installed in any organization that handles money, but in the following, the system installed in a bank will be described as an example. Therefore, in the following, a user of the money processing system 1 is referred to as a "customer." As shown in the figure, the money processing system 1 is configured by connecting counter terminals 10a to 10c, a money processing device 20, a branch server 30, and a center server 40 via communication lines 80 and 81.

The counter terminals 10a to 10c are terminal devices installed in a first line L1, which is an area just behind a counter C in a bank branch, and operated by counter staff when transactions requested by customers are processed. Note that, in the case where the counter terminals 10a to 10c are not distinguished, these terminals are sometimes referred to as the counter terminals 10. The figure shows three counter terminals 10, but two or less or four or more counter terminals 10 may be disposed. In the exemplary embodiment, the counter terminals 10a to 10c are provided as an example of a first device.

The money processing device 20 is a teller machine that performs deposit processing and withdrawal processing of money. It is assumed that the money processing device 20 was originally used by bank staff in a second line L2, which is a deep area behind the counter C, and is installed in a lobby LB to be directly operated by the customers. Therefore, the money processing device 20 is a so-called "lobby teller machine." The money processing device 20 has specifications that are suitable for use by bank staff, and unlike ATMs, for example, the money processing device 20 does not have a mechanism to restore money forgotten in a withdrawal port. In the exemplary embodiment, the money processing device 20 is provided as an example of a second device that is located away from the first device.

The branch server 30 is a server device that performs data management in a bank branch. For example, the branch server 30 temporarily holds data sent from the counter terminals 10 and transmits the data to the money processing device 20 at an appropriate time.

The center server 40 is a server device installed in a center that supervises plural bank branches, and performs various transactions based on transaction information transmitted from terminals in each branch. The center server 40 has a ledger 41 that records transaction information for accounts in each branch.

The communication line 80 is a communication line that connects the branch and the center. As the communication line 80, for example, the Internet may be used, but is not limited thereto.

The communication line 81 is a communication line used for performing information communication among the counter terminals 10, the money processing device 20, and the branch server 30. As the communication line 81, for example, a local area network (LAN) may be used, but is not limited thereto.

Configuration of Counter Terminal

Figure 2:
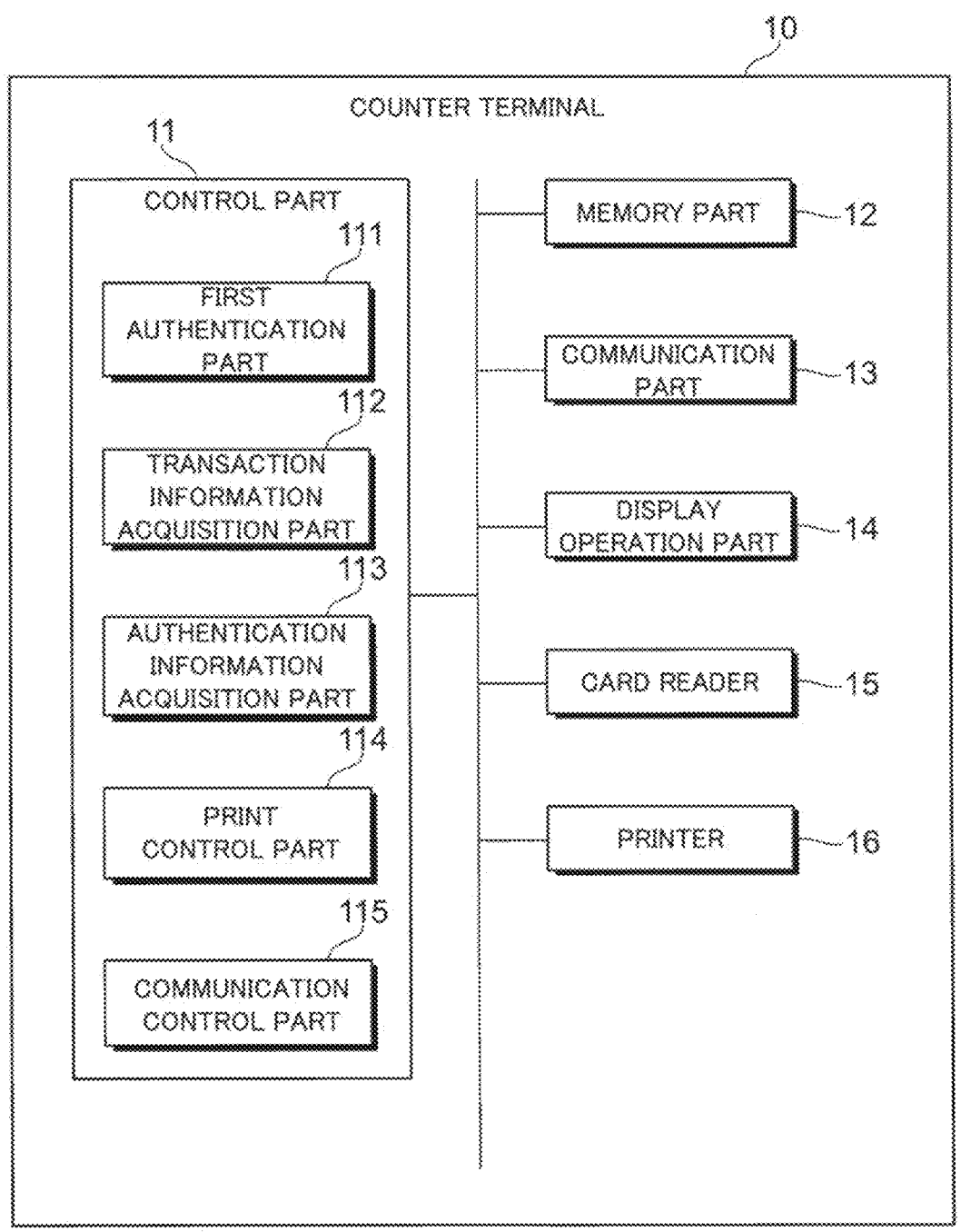
FIG. 2 shows a configuration example of a counter terminal in the exemplary embodiment of the present disclosure.

FIG. 2 is a block diagram showing a configuration example of the counter terminal 10 in the exemplary embodiment. As shown in the figure, the counter terminal 10 includes: a control part 11; a memory part 12; a communication part 13; a display operation part 14; a card reader 15; and a printer 16.

The control part 11 is provided with an arithmetic circuit such as a central processing unit (CPU), and controls each part of the counter terminal 10 (the communication part 13, the display operation part 14, the card reader 15, the printer 16, etc.) in accordance with programs stored in the memory part 12.

The memory part 12 includes a read only memory (ROM), a random access memory (RAM), etc., to memorize operating programs of the control part 11, and to be used as a work area in control processing of the control part 11. The operating programs include a program for execution of the processing to be described later by the control part 11, which is a computer.

The communication part 13 performs information communication with the money processing device 20, the branch server 30, and the center server 40 via the communication line.

The display operation part 14 is, for example, a touch panel display that accepts operations by a user and displays various types of information.

The card reader 15 is a reading device that reads information from a card carried by a user. Examples of the card include a cash card. When a customer passes a card through the card reader 15, the card reader 15 reads card information from the card.

The printer 16 prints the information on a sheet such as a roll of paper. A sheet subjected to printing by the printer 16 is discharged to the front of the device, for example.

Here, the configuration of the control part 11 will be specifically described. The control part 11 includes: a first authentication part 111; a transaction information acquisition part 112; an authentication information acquisition part 113; a print control part 114; and a communication control part 115.

When starting a withdrawal transaction, the first authentication part 111 authenticates a customer by a first authentication method. The first authentication method is an authentication method using, for example, a cash card and identity verification information.

Specifically, the first authentication part 111 determines whether or not a cash card has been read by the card reader 15, and if it is determined that a cash card has been read by the card reader 15, the first authentication part 111 acquires card information read from the cash card. The card information is, for example, the account number stored on the cash card.

In addition, the first authentication part 111 acquires identity verification information. The identity verification information is a result of confirmation whether the customer is the holder of the cash card performed by the bank staff. For example, the identity verification information may be a result acquired by the bank staff who received an identification card from a customer and confirmed the identity of the customer. Alternatively, the identity verification information may be a result acquired by a counter terminal 10 that scanned an identification card, which the bank staff received from a customer, and confirmed the identity of the customer based on the scanned data. The identification card may be a driver's license, a passport, etc. In addition, identity verification information may be other than the identification card. Examples of such identification information include a PIN code linked to a cash card. The first authentication part 111 authenticates the customer based on the identity verification information, and determines whether or not the authentication has been successful.

In the exemplary embodiment, the first authentication part 111 is provided as an example of a first authentication section that authenticates a user with the first authentication method when the withdrawal transaction is started. In the exemplary embodiment, the card including the cash card is provided as an example of a first source that includes information authenticating a user, and the card reader 15 is provided as an example of a reader that reads information authenticating a user.

The transaction information acquisition part 112 acquires transaction information related to transactions on the account having the account number acquired by the first authentication part 111. Particularly, here, the transaction information acquisition part 112 acquires the withdrawal amount as the transaction information. For example, the transaction information acquisition part 112 may acquire the withdrawal amount entered by the bank staff based on the withdrawal slip written by the customer as transaction information. Alternatively, the transaction information acquisition part 112 may acquire the withdrawal amount obtained by character recognition from the scanned data of the withdrawal slip written by the customer as the transaction information. Then, the transaction information acquisition part 112 transmits the account number acquired by the first authentication part 111 and information of the withdrawal amount acquired here to the center server 40 using the communication part 13. In addition, the transaction information acquisition part 112 receives the result of determination made by the center server 40 whether the withdrawal amount can be withdrawn from the account with the account number using the communication part 13.

The authentication information acquisition part 113 acquires authentication information used by a second authentication part 211 (to be described later) and a third authentication part 212 (to be described later) of the money processing device 20 for authenticating the customer. The authentication information includes entered authentication information and reference authentication information. The entered authentication information is the authentication information entered to the money processing device 20 by the customer. Examples of the entered authentication information include a QR code (registered trademark) embedded with the withdrawal amount. The entered authentication information is printed on a medium such as paper to be output. Examples of the reference authentication information include biological information such as face images or fingerprint images, and one-time passwords. The reference authentication information may be embedded in the QR code and printed, or transmitted to the money processing device 20 via the communication line 81.

In the case where the authentication information is the QR code or the one-time password, the authentication information acquisition part 113 acquires the QR code or the one-time password as the authentication information by generating the QR code or the one-time password.

In the case where the authentication information is biometric information, the authentication information acquisition part 113 acquires biometric information as the authentication information by means of acquisition in accordance with the type of the biometric information. For example, if the biometric information is a face image, a face image may be obtained by an unillustrated camera, and, if the biometric information is a fingerprint image, a fingerprint image may be obtained by an unillustrated fingerprint scanner.

In the exemplary embodiment, the authentication information acquisition part 113 is provided as an example of an acquisition section that acquires authentication information used for authenticating a user by a second authentication section with a second authentication method. In addition, in the exemplary embodiment, the authentication information acquisition part 113 is provided as an example of an acquisition section that acquires reference authentication information serving as a reference for authenticating a user by the second authentication section with the second authentication method.

The print control part 114 controls the printer 16 so that the authentication information acquired by the authentication information acquisition part 113 is printed on a medium such as paper. Specifically, the print control part 114 controls the printer 16 to output a QR code receipt in which the QR code acquired by the authentication information acquisition part 113 as the entered authentication information is printed on a medium such as paper. In addition, the print control part 114 may control the printer 16 to embed the one-time password or the biological information acquired by the authentication information acquisition part 113 as the reference authentication information in the QR code and output the QR code receipt. In the exemplary embodiment, the print control part 114 is provided as an example of an output section that outputs the authentication information on a medium.

The communication control part 115 controls the communication part 13 to transmit the one-time password or the biological information acquired by the authentication information acquisition part 113 as the reference authentication information to the money processing device 20. Alternatively, the communication control part 115 may transmit the one-time password or the biological information acquired by the authentication information acquisition part 113 as the reference authentication information to an external device such as the branch server 30 that can transmit information to the money processing device 20, and the external device may transmit the one-time password or the biometric information to the money processing device 20. In the exemplary embodiment, the function of the communication control part 115 is provided as an example of a transmission section that transmits reference authentication information to a money processing device or an external device that can transmit information to the money processing device.

In addition, the communication control part 115 notifies the customer of the one-time password acquired by the authentication information acquisition part 113. For example, the communication control part 115 should control the communication part 13 to transmit the one-time password to a mobile terminal carried by the customer.

Configuration of Money Processing Device

Figure 3:
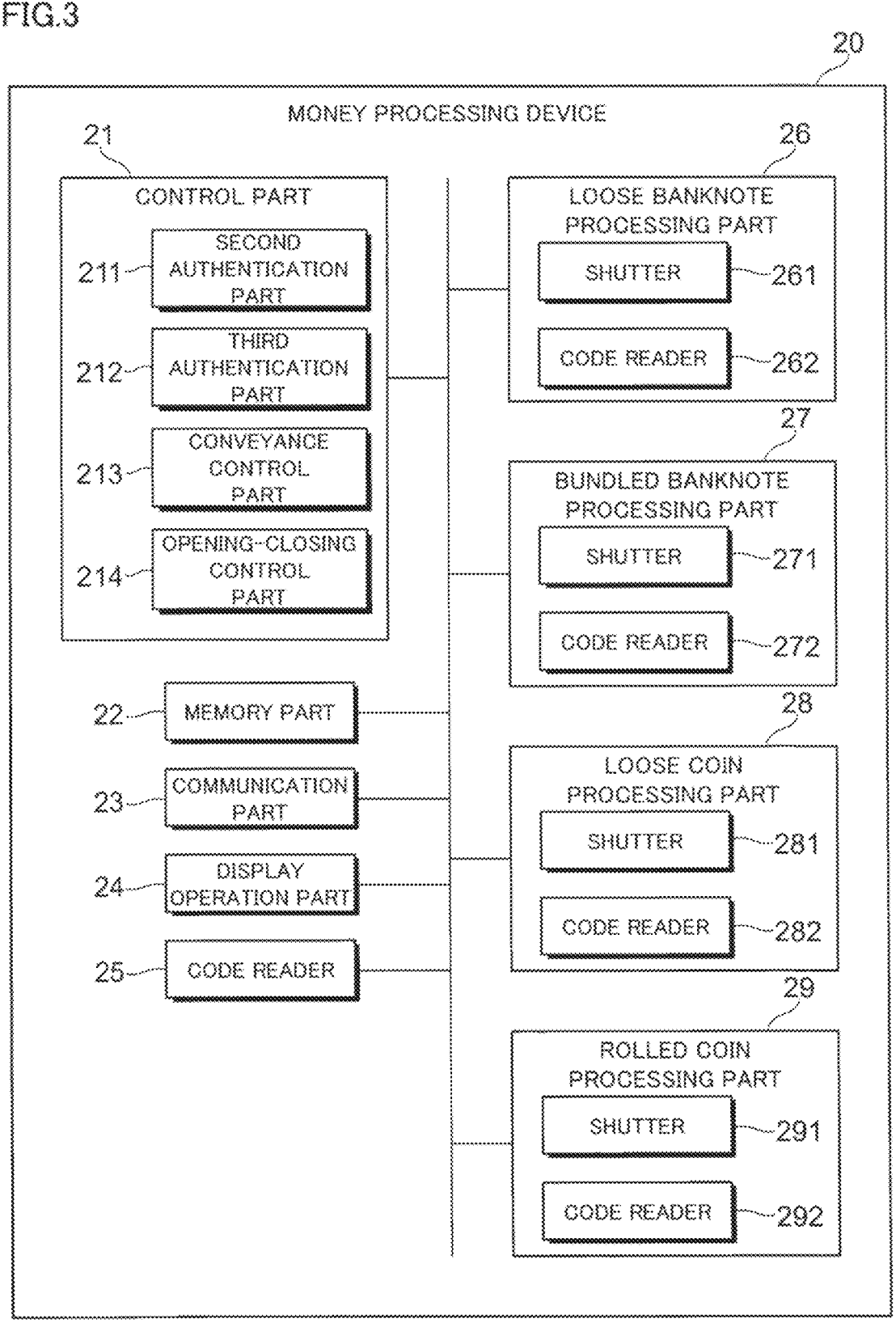
FIG. 3 is a block diagram showing a functional configuration example of a money processing device according to the exemplary embodiment of the present disclosure.

FIG. 3 is a block diagram showing a configuration example of the money processing device 20 in the exemplary embodiment. As shown in the figure, the money processing device 20 includes: a control part 21; a memory part 22; a communication part 23; a display operation part 24; a code reader 25; a loose banknote processing part 26; a bundled banknote processing part 27; a loose coin processing part 28; and a rolled coin processing part 29.

The control part 21 is provided with an arithmetic circuit such as a CPU, and controls each part of the money processing device 20 (the communication part 23, the display operation part 24, the code reader 25, the loose banknote processing part 26, the bundled banknote processing part 27, the loose coin processing part 28, the rolled coin processing part 29, etc.) in accordance with programs stored in the memory part 22.

The memory part 22 includes a ROM, a RAM, etc., to memorize operating programs of the control part 21, and to be used as a work area in control processing of the control part 21. The operating programs include a program for execution of the processing to be described, later by the control part 21, which is a computer.

The communication part 23 performs information communication with the counter terminals 10, the branch server 30, and the center server 40 via the communication line.

The display operation part 24 is, for example, a touch panel display that accepts operations by a user and displays various types of information.

The code reader 25 is a reading device that reads code information from a medium such as paper carried by a user. Examples of the medium include a QR code receipt on which a QR code is printed. When a customer holds a QR code receipt over the code reader 25, the code reader 25 reads a QR code from the QR code receipt.

The loose banknote processing part 26 includes a loose banknote storage part (not shown) that stores banknotes in a loose state (loose banknotes) by each denomination. In response to a request of a customer, the loose banknote processing part 26 discharges loose banknotes stored in the loose banknote storage part to a loose banknote withdrawal port (not shown). In the exemplary embodiment, the loose banknote processing part 26 is provided as an example of a unit that processes loose banknotes.

In addition, the loose banknote processing part 26 includes a shutter 261 on the front of the loose banknote withdrawal port. The shutter 261 blocks the inside of the loose banknote withdrawal port from the outside to prevent the loose banknotes discharged to the loose banknote withdrawal port from being taken out, and cancels the blockage when an opening order is received from the control part 21. In the exemplary embodiment, the shutter 261 is provided as an example of an opening-closing part of the withdrawal port.

Further, the loose banknote processing part 26 is provided with a code reader 262 near the loose banknote withdrawal port. The code reader 262 is a reading device that reads code information from a medium such as paper carried by a user. Examples of the medium include a QR code receipt on which a QR code is printed. When a customer holds a QR code receipt over the code reader 262, the code reader 262 reads a QR code from the QR code receipt.

The bundled banknote processing part 27 includes a bundled banknote forming part (not shown) that bundles a predetermined number (for example, 100) of loose banknotes to form banknotes in a bundled state (bundled banknotes), and a bundled banknote storage part (not shown) that stores the bundled banknotes. The bundled banknote processing part 27 is connected to the loose banknote processing part 26; thereby, based on the loose banknotes sent from the loose banknote processing part 26, the bundled banknote processing part 27 generates bundles of banknotes in the bundled banknote forming part and stores thereof in the bundled banknote storage part. In response to the request of the customer, the bundled banknote processing part 27 discharges bundles of banknotes stored in the bundled banknote storage part to a bundled banknote withdrawal port (not shown). In the exemplary embodiment, the bundled banknote processing part 27 is provided as an example of a unit that processes the bundled banknotes.

In addition, the bundled banknote processing part 27 includes a shutter 271 on the front of the bundled banknote withdrawal port. The shutter 271 blocks the inside of the bundled banknote withdrawal port from the outside to prevent the bundled banknotes discharged to the bundled banknote withdrawal port from being taken out, and cancels the blockage when an opening order is received from the control part 21. In the exemplary embodiment, the shutter 271 is provided as an example of an opening-closing part of the withdrawal port.

Further, the bundled banknote processing part 27 is provided with a code reader 272 near the bundled banknote withdrawal port. The code reader 272 is a reading device that reads code information from a medium such as paper carried by a user. Examples of the medium include a QR code receipt on which a QR code is printed. When a customer holds a QR code receipt over the code reader 272, the code reader 272 reads a QR code from the QR code receipt.

The loose coin processing part 28 includes a loose coin storage part (not shown) that stores coins in a loose state (loose coins) by each denomination. In response to a request of a customer, the loose coin processing part 28 discharges loose coins stored in the loose coin storage part to a loose coin withdrawal port (not shown). In the exemplary embodiment, the loose coin processing part 28 is provided as an example of a unit that processes loose coins.

In addition, the loose coin processing part 28 includes a shutter 281 on the front of the loose coin withdrawal port. The shutter 281 blocks the inside of the loose coin withdrawal port from the outside to prevent the loose coins discharged to the loose coin withdrawal port from being taken out, and cancels the blockage when an opening order is received from the control part 21. In the exemplary embodiment, the shutter 281 is provided as an example of an opening-closing part of the withdrawal port.

Further, the loose coin processing part 28 is provided with a code reader 282 near the loose coin withdrawal port. The code reader 282 is a reading device that reads code information from a medium such as paper carried by a user. Examples of the medium include a QR code receipt on which a QR code is printed. When a customer holds a QR code receipt over the code reader 282, the code reader 282 reads a QR code from the QR code receipt.

The rolled coin processing part 29 includes a rolled coin forming part (not shown) that packages a predetermined number (for example, 50) of loose coins to form coins in a rolled state (rolled coins), and a rolled coin storage part (not shown) that stores the rolled coins. The rolled coin processing part 29 is connected to the loose coin processing part 28; thereby, based on the loose coins sent from the loose coin processing part 28, the rolled coin processing part 29 generates rolls of coins in the rolled coin forming part and stores thereof in the rolled coin storage part. In response to a request of a customer, the rolled coin processing part 29 discharges rolled coins stored in the rolled coin storage part to a rolled coin withdrawal port (not shown). In the exemplary embodiment, the rolled coin processing part 29 is provided as an example of a unit that processes rolled coins.

In addition, the rolled coin processing part 29 includes a shutter 291 on the front of the rolled coin withdrawal port. The shutter 291 blocks the inside of the rolled coin withdrawal port from the outside to prevent the rolled coins discharged to the rolled coin withdrawal port from being taken out, and cancels the blockage when an opening order is received from the control part 21. In the exemplary embodiment, the shutter 291 is provided as an example of an opening-closing part of the withdrawal port.

Further, the rolled coin processing part 29 is provided with a code reader 292 near the rolled coin withdrawal port. The code reader 292 is a reading device that reads code information from a medium such as paper carried by a user. Examples of the medium include a QR code receipt on which a QR code is printed. When a customer holds a QR code receipt over the code reader 292, the code reader 292 reads a QR code from the QR code receipt.

Here, the configuration of the control part 21 will be specifically described. The control part 21 includes: a second authentication part 211; a third authentication part 212; a conveyance control part 213; and an opening-closing control part 214.

When opening the shutters of the individual withdrawal ports where money related to withdrawal transactions has been conveyed, the second authentication part 211 authenticates a customer by a second authentication method different from the first authentication method. The second authentication method is an authentication method using, for example, a QR code.

In the exemplary embodiment, the second authentication part 211 is provided as an example of a second authentication section that authenticates a user with the second authentication method, which is different from the first authentication method, when opening the opening-closing parts of the individual withdrawal ports where money related to withdrawal transactions has been conveyed.

Specifically, the second authentication part 211 may authenticate a customer with the second authentication method when the shutter of each withdrawal port is opened. In other words, here, instead of opening the shutters of the withdrawal ports where the money is conveyed at once, the shutter is opened for each withdrawal port or for each unit of banknotes or coins, to thereby encourage the customer to surely pick up the money.

Here, the shutters of the withdrawal ports include: the shutter 261 of the loose banknote withdrawal port; the shutter 271 of the bundled banknote withdrawal port; the shutter 281 of the loose coin withdrawal port; and the shutter 291 of the rolled coin withdrawal port. For example, to begin with, when opening the shutter 271 of the bundled banknote withdrawal port, the second authentication part 211 authenticates the customer with the second authentication method based on the QR code read by the code reader 272. Next, when opening the shutter 261 of the loose banknote withdrawal port, the second authentication part 211 authenticates the customer with the second authentication method based on the QR code read by the code reader 262. Next, when opening the shutter 291 of the rolled coin withdrawal port, the second authentication part 211 authenticates the customer with the second authentication method based on the QR code read by the code reader 292. Next, when opening the shutter 281 of the loose coin withdrawal port, the second authentication part 211 authenticates the customer with the second authentication method based on the QR code read by the code reader 282. In the exemplary embodiment, the QR code is provided as an example of a second source that includes information authenticating a user and is different from the first source, and each of QR readers such as the code readers 262, 272, 282 and 292 is provided as an example of a reader that reads information authenticating a user.

Note that the loose banknote processing part 26 may have plural loose banknote withdrawal ports, and the plural shutters 261 that open and close the respective loose banknote withdrawal ports. In this case, the second authentication part 211 may authenticate the customer with the second authentication method every time each shutter 261 is opened, or may authenticate the customer with the second authentication method only once every time the plural shutters 261 are opened.

The bundled banknotes processing part 27 may have plural bundled banknote withdrawal ports, and the plural shutters 271 that open and close the respective bundled banknote withdrawal ports. In this case, the second authentication part 211 may authenticate the customer with the second authentication method every time each shutter 271 is opened, or may authenticate the customer with the second authentication method only once every time the plural shutters 271 are opened.

The loose coin processing part 28 may have plural loose coin withdrawal ports, and the plural shutters 281 that open and close the respective loose coin withdrawal ports. In this case, the second authentication part 211 may authenticate the customer with the second authentication method every time each shutter 281 is opened, or may authenticate the customer with the second authentication method only once every time the plural shutters 281 are opened.

The rolled coin processing part 29 may have plural rolled coin withdrawal ports, and the plural shutters 291 that open and close the respective rolled coin withdrawal ports. In this case, the second authentication part 211 may authenticate the customer with the second authentication method every time each shutter 291 is opened, or may authenticate the customer with the second authentication method only once every time the plural shutters 291 are opened.

In the exemplary embodiment, the function of the second authentication part 211 is provided as an example of the second authentication section that authenticates a user with the second authentication method when opening the opening-closing part of each withdrawal port. In addition, in the exemplary embodiment, the function of the second authentication part 211 is provided as an example of the second authentication section that authenticates a user with the second authentication method when opening the opening-closing parts of the withdrawal ports included in a unit for each of the units.

In addition, the second authentication part 211 may authenticate a customer with the second authentication method when opening a shutter of a withdrawal port for a predetermined money type, and may not authenticate a customer with the second authentication method when opening a shutter of a withdrawal port for any money type other than the predetermined money type.

Here, the predetermined money type may be any or all of the loose banknotes, the bundled banknotes, the loose coins, and the rolled coins. For example, suppose that the predetermined money type is the bundled banknotes from the viewpoint that the handling amount is high. Then, when opening the shutter 271 of the bundled banknote withdrawal port, the second authentication part 211 authenticates the customer with the second authentication method based on the QR code read by the code reader 272. The second authentication part 211 does not authenticate the customer with the second authentication method when opening the shutter 261 of the loose banknote withdrawal port, the shutter 281 of the loose coin withdrawal port, and the shutter 291 of the rolled coin withdrawal port. Here, for which money type the second authentication method is used to authenticate the customer when opening the shutter of the withdrawal port may be stored in the memory part 22 in advance.

In the exemplary embodiment, the function of the second authentication part 211 is provided as an example of a second authentication section that authenticates a user with the second authentication method when opening the opening-closing part of the withdrawal port of the predetermined money type, and does not authenticate a user with the second authentication method when opening the opening-closing part of the withdrawal port of money type other than the predetermined money type.

Further, in the case of divided withdrawal, in which the withdrawal processing is performed plural times in the withdrawal port, the second authentication part 211 may authenticate the customer with the second authentication method when opening the shutter of the withdrawal port every time the withdrawal processing is performed. In other words, since forgetting to take money often occurs in divided withdrawals, the customer is made to read the QR code receipt every time the withdrawal processing is performed.

Here, the withdrawal port may be any or all of the loose banknote withdrawal port, the bundled banknote withdrawal port, the loose coin withdrawal port, and the rolled coin withdrawal port. For example, suppose that the withdrawal port is the loose banknote withdrawal port. Then, in the case where the withdrawal processing is performed plural times in the loose banknote withdrawal port, when opening the shutter 261 of the loose banknote withdrawal port every time the withdrawal processing is performed, the second authentication part 211 authenticates the customer with the second authentication method based on the QR code read by the code reader 262.

In the exemplary embodiment, in the case where the withdrawal processing is performed plural times in the withdrawal port in the withdrawal transaction, the function of the second authentication part 211 is provided as an example of the second authentication section that authenticates a user with the second authentication method when opening the opening-closing part of the withdrawal port every time the withdrawal processing is performed.

Further, in the case of divided withdrawal, in which the withdrawal processing is performed plural times in the withdrawal port, it may be possible that the second authentication part 211 does not authenticate the customer with the second authentication method when opening the shutter of the withdrawal port in the first withdrawal processing, and authenticates the customer with the second authentication method when opening the shutter of the withdrawal port in the second or subsequent withdrawal processing. This is because, in the case of divided withdrawals, it is not very common to forget to take the money that was withdrawn in the first withdrawal processing, but it is easy to forget to take the money that was withdrawn in the second or subsequent withdrawal processing.

Here, the withdrawal port may be any or all of the loose banknote withdrawal port, the bundled banknote withdrawal port, the loose coin withdrawal port, and the rolled coin withdrawal port. For example, it is assumed that the withdrawal port is the loose banknote withdrawal port. Then, in the case where the withdrawal processing is performed plural times in the loose banknote withdrawal port, when opening the shutter 261 of the loose banknote withdrawal port in the first withdrawal processing, the second authentication part 211 does not authenticate the customer with the second authentication method. When opening the shutter 261 of the loose banknote withdrawal port in the second or subsequent withdrawal processing, the second authentication part 211 authenticates the customer with the second authentication method based on the QR code read by the code reader 262.

In the exemplary embodiment, in the case where the withdrawal processing is performed plural times in the withdrawal port in the withdrawal transaction, the function of the second authentication part 211 is provided as an example of the second authentication section that does not authenticate a user with the second authentication method when opening the opening-closing part of the withdrawal port in the first withdrawal processing, and authenticates the user with the second authentication method when opening the opening-closing part of the withdrawal port in the second or subsequent withdrawal processing.

Note that the second authentication part 211 is assumed to perform authentication only by reading the QR code as the second authentication method, but is not limited thereto.

For example, the second authentication part 211 may determine whether the withdrawal amount included in the read QR code matches the withdrawal amount obtained in advance. Here, the withdrawal amount obtained in advance may be the withdrawal amount acquired by the third authentication part 212 when the withdrawal processing is started at the money processing device 20, or the withdrawal amount sent from the counter terminal 10 when the withdrawal transaction is started.

Alternatively, the second authentication part 211 may have the customer enter the one-time password and determine whether the one-time password matches the one-time password embedded in the QR code. However, as will be described later, the third authentication part 212 has already confirmed whether or not the customer is the identical person when starting the withdrawal processing at the money processing device 20; accordingly, having the customer enter the one-time password each time the money is taken out is a heavy burden on the customer. Therefore, in the following, the description will be given assuming that the second certification part 211 has the customer only read the QR code receipt.

When starting processing to convey the money related to the withdrawal transaction to the withdrawal port, the third authentication part 212 authenticates the customer with a third authentication method. The third authentication method is an authentication method using, for example, a QR code and a one-time password. The one-time password is used in addition to the QR code to prevent withdrawal only by the QR code if the QR code receipt is obtained by a third party.

Specifically, if it is determined that the QR code receipt is held over the code reader 25, the third authentication part 212 acquires the withdrawal amount and the one-time password from the QR code, and also acquires the one-time password entered by the customer. Then, the third authentication part 212 determines whether or not the one-time password entered by the customer matches the one-time password acquired from the QR code.

In the exemplary embodiment, the third authentication part 212 is provided as an example of a third authentication section that authenticates a user with the third authentication method when processing to convey the money related to the withdrawal transaction to the withdrawal port is started. In the exemplary embodiment, the QR code is provided as an example of a source that includes information having a one-time password, and the code reader 25 is provided as an example of a reader that reads information having a one-time password.

Note that, here, the one-time password has been added to the third authentication method to differentiate thereof from the second authentication method, but the third authentication method may be the same as the second authentication method. However, the second authentication method and the third authentication method should be different from the first authentication method.

In addition, an expiration period may be optionally set to the one-time password to impose a restriction on a transaction assumed to be overdue.

The conveyance control part 213 performs control so that the money related to the withdrawal transaction is conveyed to each withdrawal port. When the third authentication part 212 determines that the customer has been successfully authenticated with the third authentication method, the conveyance control part 213 performs control so that the money corresponding to the withdrawal amount acquired from the QR code by the third authentication part 212 is conveyed to each withdrawal port. Specifically, the conveyance control part 213 performs control on conveyance of the loose banknotes from the loose banknotes storage part to the loose banknote withdrawal port by the loose banknote processing part 26, and conveyance of the bundled banknotes from the bundled banknotes storage part to the bundled banknote withdrawal port by the bundled banknotes processing part 27. The conveyance control part 213 also performs control on conveyance of the loose coins from the loose coin storage part to the loose coin withdrawal port by the loose coin processing part 28, and conveyance of the rolled coins from the rolled coin storage part to the rolled coin withdrawal port by the rolled coin processing part 29.

The opening-closing control part 214 controls opening and closing of the shutter of each withdrawal port. Specifically, the control is performed so that, when the second authentication part 211 acquires the QR code read by the code reader of each withdrawal port, the shutter of the withdrawal port is opened. For example, upon acquisition of the QR code read by the code reader 262 of the loose banknote withdrawal port, the opening-closing control part 214 performs control to open the shutter 261 of the loose banknote withdrawal port. Upon acquisition of the QR code read by the code reader 272 of the bundled banknote withdrawal port, the opening-closing control part 214 performs control to open the shutter 271 of the bundled banknote withdrawal port. Upon acquisition of the QR code read by the code reader 282 of the loose coin withdrawal port, the opening-closing control part 214 performs control to open the shutter 281 of the loose coin withdrawal port. Upon acquisition of the QR code read by the code reader 292 of the rolled coin withdrawal port, the opening-closing control part 214 performs control to open the shutter 291 of the rolled coin withdrawal port.

In addition, there may be a configuration such that, when the QR code acquired as described above is held over at the entrance of a booth, the booth is unlocked to allow admittance, and the unlocking by the QR code is notified to an operator so as to prepare user information. With such a configuration, the security for admittance to the booth can be improved, and remote consultation using the booth can be smoothly carried out.

Operation of Counter Terminal

FIG. 4 is a flowchart showing an operation example of the counter terminal 10 in the exemplary embodiment. A bank staff member who has received a cash card from a customer enters the start of a withdrawal transaction to the display operation part 14 of the counter terminal 10, to thereby start the operation example.

As shown in the figure, upon starting the operation, at the counter terminal 10, the first authentication part 111 determines whether or not the cash card has been read by the card reader 15 (step 131).

If it is determined, in step 131, that the card reader 15 has not read the cash card, the first authentication part 111 repeats the processing in step 131.

If it is determined, in step 131, that the card reader 15 has read the cash card, the first authentication part 111 acquires card information read from the cash card by the card reader 15 (step 132). To be specific, the first authentication part 111 acquires the account number stored in the cash card.

Next, the first authentication part 111 acquires identity verification information (step 133). The identity verification information may be, for example, a result of confirmation whether the customer is the holder of the cash card made by the bank staff.

Then, the first authentication part 111 performs authentication based on the identity verification information acquired in step 133, and determines whether or not the authentication has been successful (step 134).

If it is determined in step 134 that the authentication has not succeeded, the control part 11 suspends the transaction requested by the customer, and terminates the processing. For example, if the identity verification information is not the information that the customer is the identical person confirmed by the bank staff, the control part 11 terminates the processing.

If it is determined in step 134 that the authentication has succeeded, the control part 11 executes processing in step 135 and subsequent steps. For example, if the identity verification information is the information that the customer is the identical person confirmed by the bank staff, the control part 11 executes processing in step 135 and subsequent steps.

In other words, the transaction information acquisition part 112 acquires the withdrawal amount as the transaction information (step 135). For example, the transaction information acquisition part 112 may acquire the withdrawal amount entered by the bank staff based on the withdrawal slip written by the customer as transaction information.

Then, the transaction information acquisition part 112 determines whether or not the withdrawal amount acquired in step 135 can be withdrawn from the account with the account number acquired in step 132 (step 136). For example, the transaction information acquisition part 112 controls the communication part 13 to transmit the account number and the withdrawal amount to the center server 40. Consequently, the center server 40 determines whether or not the withdrawal from the account is possible based on the account balance of the account number, and returns the determination result to the counter terminal 10. Note that, if the center server 40 determines that the withdrawal from the account can be made, the ledger 41 is updated based on the withdrawal amount.

If it is determined in step 136 that the withdrawal from the account is impossible, the control part 11 suspends the transaction requested by the customer, and terminates the processing.

If it is determined in step 136 that the withdrawal from the account is possible, the control part 11 executes processing in step 137 and subsequent steps.

That is, the authentication information acquisition part 113 generates a one-time password to be used when the customer starts the withdrawal processing at the money processing device 20 (step 137).

Then, the authentication information acquisition part 113 generates a QR code including the withdrawal amount acquired in step 135 and the one-time password generated in step 137 (step 138).

Next, the print control part 114 controls the printer 16 to output a QR code receipt on which the QR code generated in step 138 is printed (step 139).

The communication control part 115 then notifies the customer of the one-time password generated in step 137 (step 140). For example, the communication control part 115 should control the communication part 13 to transmit the one-time password to a mobile terminal carried by the customer.

Operation of Money Processing Device

Figures 2, 5:
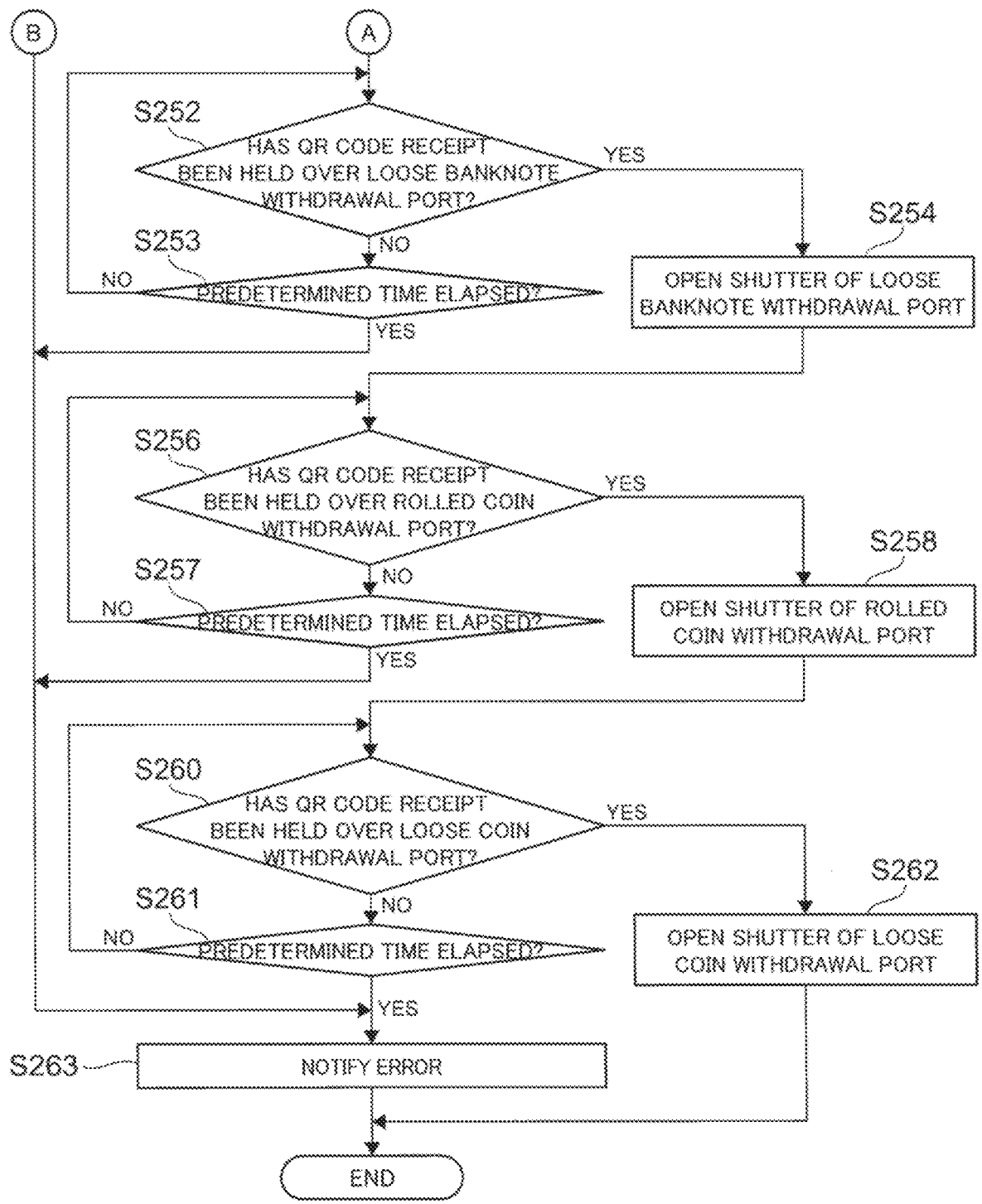

FIGS. 5-1 and 5-2 are flowcharts showing a first operation example of the money processing device 20 in the exemplary embodiment. The first operation example is an operation example in which the QR code receipt is held over when the shutter of each withdrawal port is opened in the case where the plural withdrawal ports are provided for the respective money types. The operation example starts when the customer who requested the start of withdrawal transaction on the counter terminal 10 enters the start of the withdrawal processing on the display operation part 24 of the money processing device 20.

As shown in FIG. 5-1, upon starting the operation, in the money processing device 20, first, the third authentication part 212 determines whether or not the QR code receipt output in step 139 in FIG. 4 has been held over the code reader 25 (step 231). For example, the third authentication part 212 should provide guidance to hold the QR code receipt over the code reader 25 so that the QR code receipt is held over the code reader 25.

If it is determined in step 231 that the QR code receipt has not been held over the code reader 25, the third authentication part 212 determines whether or not a predetermined time has elapsed since providing the guidance (step 232). Then, if it is determined that the predetermined time has not elapsed yet, the third authentication part 212 returns the processing to step 231. Alternatively, if it is determined that the predetermined time has already elapsed, the processing proceeds to FIG. 5-2, and the control part 21 notifies the counter terminal 10 of an error, for example (step 263).

If it is determined in step 231 that the QR code receipt has been held over the code reader 25, the third authentication part 212 acquires the withdrawal amount and the one-time password from the QR code printed on the QR code receipt (step 233). On the other hand, the third authentication part 212 acquires the one-time password entered by the customer (step 234). Then, the third authentication part 212 determines whether or not the authentication based on the one-time password has succeeded (step 235). To be specific, it is determined whether or not the one-time password acquired in step 234 matches the one-time password acquired in step 233.

If it is determined in step 235 that the authentication based on the one-time password has not succeeded, that is, if it is determined that the one-time passwords did not match, the third authentication part 212 returns the processing to step 234.

If it is determined in step 235 that the authentication based on the one-time password succeeded, that is, if it is determined that the one-time passwords matched, the control part 21 executes processing in step 236 and subsequent steps.

In other words, the conveyance control part 213 performs control to convey money corresponding to the withdrawal amount acquired in step 233 to each withdrawal port (step 236). Specifically, the conveyance control part 213 controls the bundled banknotes processing part 27 to convey the bundled banknotes, from among the money corresponding to the withdrawal amount acquired in step 233, to the bundled banknote withdrawal port, and controls the loose banknote processing part 26 to convey the loose banknotes to the loose banknote withdrawal port. In addition, the conveyance control part 213 controls the rolled coin processing part 29 to convey the rolled coins, from among the money corresponding to the withdrawal amount acquired in step 233, to the rolled coin withdrawal port, and controls the loose coin processing part 28 to convey the loose coins to the loose coin withdrawal port.

Next, the second authentication part 211 determines whether or not the QR code receipt output in step 139 in FIG. 4 has been held over the code reader 272 of the bundled banknote withdrawal port (step 238). For example, the second authentication part 211 should provide guidance to hold the QR code receipt over the code reader 272 so that the QR code receipt is held over the code reader 272.

If it is determined in step 238 that the QR code receipt has not been held over the code reader 272, the second authentication part 211 determines whether or not a predetermined time has elapsed since providing the guidance (step 239). Then, if it is determined that the predetermined time has not elapsed yet, the second authentication part 211 returns the processing to step 238.

If it is determined in step 238 that the QR code receipt has been held over the code reader 272, the opening-closing control part 214 performs control to open the shutter 271 of the bundled banknote withdrawal port (step 240).

On the other hand, if it is determined in step 239 that the predetermined time has already elapsed, the processing proceeds to FIG. 5-2; the control part 21 notifies the counter terminal 10 of an error, for example, without causing the opening-closing control part 214 to perform control to open the shutter 271 of the bundled banknote withdrawal port (step 263). Consequently, even in the case where the customer forgot to take the bundled banknotes from the bundled banknote withdrawal port and left there, a third party cannot take the bundled banknotes because the shutter 271 of the bundled banknote withdrawal port is closed.

Next, as shown in FIG. 5-2, the second authentication part 211 determines whether or not the QR code receipt output in step 139 in FIG. 4 has been held over the code reader 262 of the loose banknote withdrawal port (step 252). For example, the second authentication part 211 should provide guidance to hold the QR code receipt over the code reader 262 so that the QR code receipt is held over the code reader 262.

If it is determined in step 252 that the QR code receipt has not been held over the code reader 262, the second authentication part 211 determines whether or not a predetermined time has elapsed since providing the guidance (step 253). Then, if it is determined that the predetermined time has not elapsed yet, the second authentication part 211 returns the processing to step 252.

If it is determined in step 252 that the QR code receipt has been held over the code reader 262, the opening-closing control part 214 performs control to open the shutter 261 of the loose banknote withdrawal port (step 254).

On the other hand, if it is determined in step 253 that the predetermined time has already elapsed, the control part 21 notifies the counter terminal 10 of an error, for example, without causing the opening-closing control part 214 to perform control to open the shutter 261 of the loose banknote withdrawal port (step 263). Consequently, even in the case where the customer forgot to take the loose banknotes from the loose banknote withdrawal port and left there, a third party cannot take the loose banknotes because the shutter 261 of the loose banknote withdrawal port is closed.

Next, the second authentication part 211 determines whether or not the QR code receipt output in step 139 in FIG. 4 has been held over the code reader 292 of the rolled coin withdrawal port (step 256). For example, the second authentication part 211 should provide guidance to hold the QR code receipt over the code reader 292 so that the QR code receipt is held over the code reader 292.

If it is determined in step 256 that the QR code receipt has not been held over the code reader 292, the second authentication part 211 determines whether or not a predetermined time has elapsed since providing the guidance (step 257). Then, if it is determined that the predetermined time has not elapsed yet, the second authentication part 211 returns the processing to step 256.

If it is determined in step 256 that the QR code receipt has been held over the code reader 292, the opening-closing control part 214 performs control to open the shutter 291 of the rolled coin withdrawal port (step 258).

On the other hand, if it is determined in step 257 that the predetermined time has already elapsed, the control part 21 notifies the counter terminal 10 of an error, for example, without causing the opening-closing control part 214 to perform control to open the shutter 291 of the rolled coin withdrawal port (step 263). Consequently, even in the case where the customer forgot to take the rolled coins from the rolled coin withdrawal port and left there, a third party cannot take the rolled coins because the shutter 291 of the rolled coin withdrawal port is closed.

Next, the second authentication part 211 determines whether or not the QR code receipt output in step 139 in FIG. 4 has been held over the code reader 282 of the loose coin withdrawal port (step 260). For example, the second authentication part 211 should provide guidance to hold the QR code receipt over the code reader 282 so that the QR code receipt is held over the code reader 282.

If it is determined in step 260 that the QR code receipt has not been held over the code reader 282, the second authentication part 211 determines whether or not a predetermined time has elapsed since providing the guidance (step 261). Then, if it is determined that the predetermined time has not elapsed yet, the second authentication part 211 returns the processing to step 260.

If it is determined in step 260 that the QR code receipt has been held over the code reader 282, the opening-closing control part 214 performs control to open the shutter 281 of the loose coin withdrawal port (step 262).

On the other hand, if it is determined in step 261 that the predetermined time has already elapsed, the control part 21 notifies the counter terminal 10 of an error, for example, without causing the opening-closing control part 214 to perform control to open the shutter 281 of the loose coin withdrawal port (step 263). Consequently, even in the case where the customer forgot to take the loose coins from the loose coin withdrawal port and left there, a third party cannot take the loose coins because the shutter 281 of the loose coin withdrawal port is closed.

FIGS. 6-1 and 6-2 are flowcharts showing a second operation example of the money processing device 20 in the exemplary embodiment. The second operation example is an operation example in which the QR code receipt is held over only when the shutter of the withdrawal port for a predetermined money type is opened in the case where the plural withdrawal ports are provided for the respective money types. The operation example starts when the customer who requested the start of withdrawal transaction on the counter terminal 10 enters the start of the withdrawal processing on the display operation part 24 of the money processing device 20.

FIG. 6-1 is the same as FIG. 5-1 except that step 237 is inserted.

That is, after executing step 236, the control part 21 determines whether or not the money type to be processed from now on is a predetermined money type (step 237). Then, if it is determined that the money type to be processed from now on is the predetermined money type, the control part 21 advances the processing to step 238. Alternatively, if it is determined that the money type to be processed from now on is not the predetermined money type, the control part 21 advances the processing to step 240.

FIG. 6-2 is the same as FIG. 5-2 except that steps 251, 255, and 259 are inserted.

That is, after executing step 240 in FIG. 6-1, the control part 21 determines whether or not the money type to be processed from now on is a predetermined money type (step 251). Then, if it is determined that the money type to be processed from now on is the predetermined money type, the control part 21 advances the processing to step 252. Alternatively, if it is determined that the money type to be processed from now on is not the predetermined money type, the control part 21 advances the processing to step 254.

Moreover, after executing step 254, the control part 21 determines whether or not the money type to be processed from now on is the predetermined money type (step 255). Then, if it is determined that the money type to be processed from now on is the predetermined money type, the control part 21 advances the processing to step 256. Alternatively, if it is determined that the money type to be processed from now on is not the predetermined money type, the control part 21 advances the processing to step 258.

Further, after executing step 258, the control part 21 determines whether or not the money type to be processed from now on is the predetermined money type (step 259). Then, if it is determined that the money type to be processed from now on is the predetermined money type, the control part 21 advances the processing to step 260. Alternatively, if it is determined that the money type to be processed from now on is not the predetermined money type, the control part 21 advances the processing to step 262.

FIG. 7 is a flowchart showing a third operation example of the money processing device 20 in the exemplary embodiment. The third operation example is an operation example in which the QR code receipt is held over when the shutter of the withdrawal port is opened every time the withdrawal processing is performed in the case where the withdrawal processing is performed plural times in the withdrawal port in the withdrawal transaction. However, in the following, to simplify the description, only the case where the withdrawal port is the loose banknote withdrawal port will be described. The operation example starts when the customer who requested the start of withdrawal transaction on the counter terminal 10 enters the start of the withdrawal processing on the display operation part 24 of the money processing device 20.

As shown in the figure, upon starting the operation, in the money processing device 20, first, the third authentication part 212 determines whether or not the QR code receipt output in step 139 in FIG. 4 has been held over the code reader 25 (step 271). For example, the third authentication part 212 should provide guidance to hold the QR code receipt over the code reader 25 so that the QR code receipt is held over the code reader 25.

If it is determined in step 271 that the QR code receipt has not been held over the code reader 25, the third authentication part 212 determines whether or not a predetermined time has elapsed since providing the guidance (step 272). Then, if it is determined that the predetermined time has not elapsed yet, the third authentication part 212 returns the processing to step 271. Alternatively, if it is determined that the predetermined time has already elapsed, the control part 21 notifies the counter terminal 10 of an error, for example (step 281).

If it is determined in step 271 that the QR code receipt has been held over the code reader 25, the third authentication part 212 acquires the withdrawal amount and the one-time password from the QR code printed on the QR code receipt (step 273). On the other hand, the third authentication part 212 acquires the one-time password entered by the customer (step 274). Then, the third authentication part 212 determines whether or not the authentication based on the one-time password has succeeded (step 275). To be specific, it is determined whether or not the one-time password acquired in step 274 matches the one-time password acquired in step 273.

If it is determined in step 275 that the authentication based on the one-time password has not succeeded, that is, if it is determined that the one-time passwords did not match, the third authentication part 212 returns the processing to step 274.

If it is determined in step 275 that the authentication based on the one-time password has succeeded, that is, if it is determined that the one-time passwords matched, the control part 21 executes processing in step 276 and subsequent steps.

In other words, the conveyance control part 213 performs control to convey the loose banknotes to be conveyed in single withdrawal processing, from among the money corresponding to the withdrawal amount acquired in step 273, to the loose banknote withdrawal port (step 276). For example, suppose that the money corresponding to the withdrawal amount acquired in step 273 is 190 of 10,000 yen banknotes, and up to 50 of 10,000 yen banknotes can be conveyed in single withdrawal processing. In this case, the amount of loose banknotes that should be conveyed in the single withdrawal processing is 50 of 10,000 yen banknotes in each of the first to the third processes, and 40 of 10,000 yen banknotes in the fourth processing.

Next, the second authentication part 211 determines whether or not the QR code receipt output in step 139 in FIG. 4 has been held over the code reader 262 of the loose banknote withdrawal port (step 278). For example, the second authentication part 211 should provide guidance to hold the QR code receipt over the code reader 262 so that the QR code receipt is held over the code reader 262.

If it is determined in step 278 that the QR code receipt has not been held over the code reader 262, the second authentication part 211 determines whether or not a predetermined time has elapsed since providing the guidance (step 279). Then, if it is determined that the predetermined time has not elapsed yet, the second authentication part 211 returns the processing to step 278.

If it is determined in step 278 that the QR code receipt has been held over the code reader 262, the opening-closing control part 214 performs control to open the shutter 261 of the loose banknote withdrawal port (step 280).

On the other hand, if it is determined in step 279 that the predetermined time has already elapsed, the control part 21 notifies the counter terminal 10 of an error, for example, without causing the opening-closing control part 214 to perform control to open the shutter 261 of the loose banknote withdrawal port (step 281). Consequently, even in the case where the customer forgot to take the loose banknotes from the loose banknote withdrawal port and left there, a third party cannot take the loose banknotes because the shutter 261 of the loose banknote withdrawal port is closed.

Thereafter, the conveyance control part 21 determines whether or not all the loose banknotes of the money corresponding to the withdrawal amount acquired in step 273 have been conveyed (step 282). Then, if it is determined that not all the loose banknotes have been conveyed, the control part 21 returns the processing to step 276. Alternatively, if it is determined that all the loose banknotes have been conveyed, the control part 21 terminates the processing.

FIG. 8 is a flowchart showing a fourth operation example of the money processing device 20 in the exemplary embodiment. The fourth operation example is an operation example in which the QR code receipt is held over only when the shutter of the withdrawal port is opened in the second or subsequent withdrawal processing in the case where the withdrawal processing is performed plural times in the withdrawal port in the withdrawal transaction. However, in the following, to simplify the description, only the case where the withdrawal port is the loose banknote withdrawal port will be described. The operation example starts when the customer who requested the start of withdrawal transaction on the counter terminal 10 enters the start of the withdrawal processing on the display operation part 24 of the money processing device 20.

FIG. 8 is the same as FIG. 7 except that step 277 is inserted.

That is, after executing step 276, the control part 21 determines whether or not this withdrawal processing is the first withdrawal processing (step 277). If it is determined that this withdrawal processing is not the first withdrawal processing, that is, if it is determined that the withdrawal processing is the second or subsequent withdrawal processing, the control part 21 advances the processing to step 278. Alternatively, if it is determined that this withdrawal processing is the first withdrawal processing, the control part 21 advances the processing to step 280.

MODIFIED EXAMPLE

In the above, the same processing is executed for all users of the money processing system 1, but is not limited thereto. For example, the second authentication part 211 may not authenticate a user having a predetermined attribute with the second authentication method when opening the shutter of the withdrawal port. Here, the predetermined attribute may be any attribute; for example, the attribute may be whether the user is a customer or a bank staff member. In this case, if the user is a customer, the second authentication part 211 performs authentication with the second authentication method, and if the user is a bank staff member, the second authentication part 211 does not perform authentication with the second authentication method. This is because the money processing device 20 was originally used by the bank staff, and it is considered that the possibility of forgetting to take money is low in the case where the user is a bank staff member.

In addition, in the above, the same processing is executed regardless of the time, but the processing of the exemplary embodiment may be executed during business hours, and the processing of the exemplary embodiment may not be executed outside of business hours.

In the above, when using a face image as the biological information, it is decided that identification of the user's face image and checking with the registered face image are conducted at most once for opening the shutter of the withdrawal port, but is not limited thereto. For example, to open the shutter of the withdrawal port once, the face image is identified and checked with the registered face image at plural times, such as at the start of processing and after completion of processing; if the face image is different, it may be determined that there is a possibility of impersonation.

In the above, it is assumed that the first authentication part 111 is disposed in the counter terminal 10, and the second authentication part 211 is disposed in the money processing device 20, but is not limited thereto. A configuration in which the first authentication part 111 is disposed in a device other than the counter terminal 10, a configuration in which the second authentication part 211 is disposed in a device other than the money processing device 20, or both may be adopted.

Effects of the Exemplary Embodiment

In the exemplary embodiment, when money is withdrawn in response to operations of a user, the money processing device 20 does not open the shutter of the withdrawal port automatically, but opens the shutter of the withdrawal port upon reading a QR code receipt. Consequently, even if the user leaves there in the state where the money is left in the withdrawal port, the money is not released to the outside of the device, and the money is prevented from being taken away by a third party.

The exemplary embodiment also makes it possible for the money processing device 20 to open the shutters of the plural withdrawal ports sequentially while limiting the shutter to be opened. This can limit the user's field of view compared to the case in which all shutters are opened at the same time, to thereby prevent the user from forgetting to take money.

Further, in the exemplary embodiment, the counter terminal 10 issues a QR code receipt and a one-time password, and the money processing device 20 has the user enter the one-time password when reading a QR code from the QR code receipt. This establishes a scheme that makes it difficult for a third party to withdraw money.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The exemplary embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A money processing system, comprising:
 a first authentication circuit configured to authenticate a user with a first authentication method when starting a withdrawal transaction; and a second authentication circuit configured to authenticate a user with a second authentication method, which is different from the first authentication method, when opening an opening-closing part of each of a plurality of withdrawal ports, to which money related to the withdrawal transaction has been conveyed, wherein when withdrawal processing is performed plural times in one of the plurality of withdrawal ports in the withdrawal transaction, the second authentication circuit does not authenticate a user with the second authentication method when opening the opening-closing part of the one of the plurality of withdrawal ports in a first withdrawal processing, and authenticates a user with the second authentication method when opening the opening-closing part of the one of the plurality of withdrawal ports in a second or subsequent withdrawal processing.

2. The money processing system according to claim 1, wherein the plurality of withdrawal ports is provided for a respective plurality of money types, and the second authentication circuit authenticates a user with the second authentication method when opening the opening-closing part of each the plurality of withdrawal ports.

3. The money processing system according to claim 1, wherein the plurality of withdrawal ports is provided for a respective plurality of money types, and the second authentication circuit authenticates a user with the second authentication method when opening an opening-closing part of a withdrawal port of a predetermined money type, and does not authenticate a user with the second authentication method when opening the opening-closing part of the withdrawal port of any of the plurality of money types other than the predetermined money type.

4. The money processing system according to claim 1, further comprising:

a plurality of units each including one of the plurality of withdrawal ports, wherein the second authentication circuit authenticates a user with the second authentication method when opening an opening-closing part of the one of the plurality of withdrawal ports included in each of the plurality of units.

5. The money processing system according to claim 1, wherein, when withdrawal processing is performed plural times in one of the plurality of withdrawal ports in the withdrawal transaction, the second authentication circuit authenticates a user with the second authentication method when opening the opening-closing part of the one of the plurality of withdrawal ports every time the withdrawal processing is performed.

6. The money processing system according to claim 1, wherein the second authentication circuit does not authenticate a user having a predetermined attribute with the second authentication method when opening the opening-closing part of each of the plurality of withdrawal ports.

7. The money processing system according to claim 1, further comprising:

a counter terminal installed at a counter; and a money processing device processing money, wherein the first authentication circuit is provided in the counter terminal, and the second authentication circuit is provided in the money processing device.

8. The money processing system according to claim 7, wherein the counter terminal comprises:

an acquisition circuit acquiring authentication information used for authenticating a user with the second authentication method by the second authentication circuit; and an output circuit outputting the authentication information on a medium.

9. The money processing system according to claim 7, wherein the counter terminal comprises:

an acquisition circuit acquiring reference authentication information serving as a reference for authenticating a user with the second authentication method by the second authentication circuit; and a transmission circuit transmitting the reference authentication information to one of the money processing device and an external device that can transmit information to the money processing device.

10. The money processing system according to claim 1, further comprising:

a third authentication circuit authenticating a user with a third authentication method when starting processing to convey money related to the withdrawal transaction to one of the plurality of withdrawal ports.

11. The money processing system according to claim 10, wherein the second authentication method and the third authentication method are different from the first authentication method.

12. The money processing system according to claim 10, wherein the third authentication circuit includes a reader reading information from a source, the information having a one-time password.

13. The money processing system according to claim 1, wherein the first authentication circuit includes a reader reading information from a first source, the information authenticating a user, and the second authentication circuit includes a reader reading information from a second source, the information authenticating a user, the second source being different from the first source.

14. The money processing system according to claim 13, wherein the reader of the first authentication circuit is a card reader reading information from a card as the first source, and the reader of the second authentication circuit is a QR reader reading information from a QR code as the second source.

15. The money processing system according to claim 14, further comprising:

a printer configured to output a QR code in a case where information read from a card in the first authentication circuit has been authenticated successfully.

16. The money processing system according to claim 15, the reader of the first authentication circuit and the printer are installed in a first device, the reader of the second authentication circuit is installed in a second device, and the second device is located away from the first device.

17. A money processing method, comprising:

authenticating a user with a first authentication method when starting a withdrawal transaction; and authenticating a user with a second authentication method, which is different from the first authentication method, when opening an opening-closing part of each of a plurality of withdrawal ports, to which money related to the withdrawal transaction has been conveyed, wherein when withdrawal processing is performed plural times in one of the plurality of withdrawal ports in the withdrawal transaction, a user is not authenticated with the second authentication method when opening the opening-closing part of the one of the plurality of withdrawal ports in a first withdrawal processing, and a user is authenticated with the second authentication method when opening the opening-closing part of the one of the plurality of withdrawal ports in a second or subsequent withdrawal processing.

* * * * *